(12) United States Patent
Hu

(10) Patent No.: US 10,374,907 B2
(45) Date of Patent: Aug. 6, 2019

(54) FINE-GRANULARITY RESOURCE CONTROL METHOD AND APPARATUS

(71) Applicant: ZTE CORPORATION, Shenzhen, Guangdong Province (CN)

(72) Inventor: Longbin Hu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 11 days.

(21) Appl. No.: 15/527,329

(22) PCT Filed: Aug. 19, 2015

(86) PCT No.: PCT/CN2015/087532
§ 371 (c)(1),
(2) Date: May 17, 2017

(87) PCT Pub. No.: WO2016/078453
PCT Pub. Date: May 26, 2016

(65) Prior Publication Data
US 2017/0339026 A1     Nov. 23, 2017

(30) Foreign Application Priority Data

Nov. 18, 2014    (CN) .......................... 2014 1 0658334

(51) Int. Cl.
*H04L 12/24*       (2006.01)
*G06F 9/50*        (2006.01)
(Continued)

(52) U.S. Cl.
CPC ................ *H04L 41/50* (2013.01); *G06F 9/50* (2013.01); *G06F 9/5011* (2013.01); *G06F 21/10* (2013.01);
(Continued)

(58) Field of Classification Search
CPC .......... G06F 9/50; G06F 9/5011; G06F 21/10; G06F 21/629; H04L 63/10; H04L 41/50;
(Continued)

(56) References Cited

U.S. PATENT DOCUMENTS 7,089,173 B1     8/2006   Molson et al.
8,200,472 B1 *    6/2012   Molson ............... G06F 17/5045
                                                                            703/13
(Continued)

FOREIGN PATENT DOCUMENTS

CN         101141460 A     3/2008
CN         101170446 A     4/2008
(Continued)

*Primary Examiner* — Man U Phan
(74) *Attorney, Agent, or Firm* — McDonald Hopkins LLC

(57) ABSTRACT

Disclosed are a fine-grained resource control method and apparatus. The method includes: defining, for a function of which resource usage is needed to be restricted, a license item in a license file, wherein the license item is used for representing a resource restriction number for supporting the function; and judging whether a preferential support command is preset for resources of the function, if presetting, controlling the resources of the function according to the preferential support command, a value of the license item and an actual resource number for supporting the function, otherwise, controlling the resources of the function directly according to the value of the license item and the actual resource number for supporting the function.

20 Claims, 2 Drawing Sheets

(51) Int. Cl.
*H04L 12/927* (2013.01)
*G06F 21/10* (2013.01)
*G06F 21/62* (2013.01)
*H04L 12/937* (2013.01)
*H04L 29/06* (2006.01)
*H04L 12/931* (2013.01)

(52) U.S. Cl.
CPC .......... *G06F 21/629* (2013.01); *H04L 47/808* (2013.01); *H04L 49/254* (2013.01); *H04L 49/00* (2013.01); *H04L 63/10* (2013.01); *H04L 2463/103* (2013.01)

(58) Field of Classification Search
CPC .............. H04L 49/00; H04L 2463/103; H04L 49/254; H04L 47/808; H04L 12/24; H04L 12/927
USPC .......................................................... 370/238
See application file for complete search history.

(56) References Cited

U.S. PATENT DOCUMENTS

| | | | | |
|---|---|---|---|---|
| 8,561,057 B2 * | 10/2013 | Kumagai | ................ | G06F 9/445 717/174 |
| 8,773,985 B2 * | 7/2014 | Wang | .................... | H04W 28/24 370/230 |
| 9,372,964 B2 * | 6/2016 | Kamphuis | ............. | G06F 21/105 |
| 9,621,366 B2 * | 4/2017 | Speks | ............... | G06F 15/17343 |
| 2008/0004027 A1 * | 1/2008 | Chen | ........................ | F01L 9/02 455/445 |
| 2010/0030851 A1 * | 2/2010 | Inden | ..................... | H04L 63/10 709/203 |
| 2013/0272121 A1 * | 10/2013 | Stanwood | ........... | H04L 47/2475 370/230 |
| 2015/0341824 A1 * | 11/2015 | Ge | ........................ | H04W 48/02 370/230 |
| 2017/0070561 A1 * | 3/2017 | Li | ........................... | H04L 67/10 |
| 2017/0118763 A1 * | 4/2017 | Zhao | .................... | H04W 76/10 |
| 2017/0161470 A1 * | 6/2017 | Feng | ..................... | G06F 21/105 |
| 2018/0113999 A1 * | 4/2018 | Azmat | .................. | G06F 21/105 |

FOREIGN PATENT DOCUMENTS

| | | |
|---|---|---|
| CN | 102075973 A | 5/2011 |
| CN | 103067211 A | 4/2013 |
| EP | 2109253 A1 | 10/2009 |
| WO | 2014068692 A1 | 5/2014 |

* cited by examiner

FINE-GRANULARITY RESOURCE CONTROL METHOD AND APPARATUS

TECHNICAL FIELD

The present disclosure relates to a resource control technology, and more particularly to a fine-grained resource control method and apparatus.

BACKGROUND

In a network communication product, such as a router, a switch, etc., a pricing mode is usually made based on hardware single boards and overall software in it. For example, a certain user requires an equipment supplier to provide hardware single board resources which include 12 gigabit Ethernet ports and 30 E1 ports, and then at least two hardware single boards of type A need to be provided according to a redundancy requirement for hardware configuration which is "the same type of ports cannot be located at one line card slot". Each line card of the type A includes 8 gigabit Ethernet ports and 24 E1 ports, so the single boards supplied to the user by the equipment supplier may include 16 gigabit Ethernet ports and 48 E1 ports, which are more than ports required by the user for 4 gigabit Ethernet ports and 18 E1 ports. These extra supplied hardware resources are usually not included in the price, and they are equivalently presented to the user for free, which results in that resource value of the equipment supplier cannot be maximized.

For another example, a certain user requires an equipment supplier to provide a software version with a K function running on a hardware single board and to price only according to the K function. However, in fact, the software version provided by the equipment supplier includes the K function as well as an L function both of which can run on the same hardware single board. In this way, after purchasing the K function, the user may also use the L function. However, the user does not pay for the L function, and the resource value of the equipment supplier cannot be maximized.

Therefore, in the network communication product such as the router, the switch, etc., it is relatively coarse of the granularity of the pricing mode based on the hardware single boards and software of the whole machine, and there are following risk problems.

It cannot be restricted to behaviors of users in personally using spare parts, modifying parameters for expansion, opening a non-payment function and the like, it cannot be restricted to software piracy and anatomy, and intellectual property cannot be protected, and then the product cannot be packaged and priced flexibly according to user demands.

SUMMARY

The technical problem to be solved by the present disclosure is to provide a fine-grained resource control method and apparatus, which are used to optimize the management of resources by a telecom equipment supplier.

To solve the abovementioned problem, the technical solution is adopted as follows.

A fine-grained resource control method includes the following steps: defining, for a function of which resource usage is needed to be restricted, a license item in a license file, in which the license item is used for representing a resource restriction number for supporting the function; and judging whether a preferential support command is preset for resources of the function, if presetting, controlling the resources of the function according to the preferential support command, a value of the license item and an actual resource number for supporting the function, otherwise, controlling the resources of the function directly according to the value of the license item and the actual resource number for supporting the function.

In an exemplary embodiment, the step of controlling the resources of the function according to the preferential support command, the value of the license item and the actual resource number for supporting the function or controlling the resources of the function directly according to the value of the license item and the actual resource number for supporting the function is executed by a controller, in which the controller is a router or another external controller equipment other than the router.

In an exemplary embodiment, the license file is stored in the controller or stored in a controlled equipment.

In an exemplary embodiment, the preferential support command specifies P resources for preferentially supporting the function; the method further includes: assuming the value of the license item is N and the actual resource number for supporting the function is M, and the step of controlling the resources of the function according to the preferential support command, the value of the license item and the actual resource number for supporting the function includes:

A. if $P \leq M$, controlling all the P resources to necessarily support the function no matter what an online sequence is;

B. if $N \geq P$, controlling the P resources to preferentially support the function, and the number of the occupied resources is not released even if the resources are not initiated or are damaged; and then, selecting N–P resources that come online first, to serve as the resources for supporting the function, from the remaining M–P resources according to the online sequence, in which, when $N-P \geq M-P$, all the M–P resources support the function, and when $N-P < M-P$, the N–P resources that come online first are selected to serve as the resources for supporting the function;

C. if $N < P$, controlling the N resources, that come online first and are preferentially selected from the P resources according to the online sequence, to support the function, and controlling the remaining M–N resources not to support the function.

In an exemplary embodiment, the value of the license item is assumed as N and the actual resource number for supporting the function is assumed as M, and the step of controlling the resources of the function directly according to the value of the license item and the actual resource number for supporting the function includes: D. if $N \geq M$, controlling the M resources to support the function, and if $N < M$, selecting the N resources that come online first to serve as the resources for supporting the function according to an online sequence of resources.

In an exemplary embodiment, when the function is a value-added service function, the license item is used for representing the number of single boards for supporting the value-added service function; the preferential support command specifies that the number of single boards for preferentially supporting the value-added service function is P; and the steps A, B and C include the following steps A', B' and C' respectively:

A'. if $P \leq M$, controlling all the P single boards to necessarily support the value-added service function no matter what an online sequence is;

B'. if $N \geq P$, controlling the P single boards to preferentially support the value-added service function; and then, selecting N–P single boards that come online first, to serve as the single boards for supporting the value-added service function, from the remaining M−P single boards according to the online sequence, in which, when N−P≥M−P, all the M−P single boards support the value-added service function, and when N−P<M−P, the N−P single boards that come online first are selected to serve as the resources for supporting the value-added service function;

C'. if N<P, controlling the N single boards, that come online first and are preferentially selected from the P single boards according to the online sequence, to support the value-added service function, and controlling the remaining M−N single boards not to support the value-added service function.

In an exemplary embodiment, when the function is a value-added service function, the license item is used for representing the number of single boards for supporting the value-added service function; the preferential support command specifies that the number of single boards for preferentially supporting the value-added service function is P; and the step D includes: if N≥M, controlling all the M single boards to support the value-added service function, and if N<M, selecting the N single boards that come online first to serve as the single boards for supporting the value-added service function according to the online sequence of resources.

In an exemplary embodiment, when the function is that ports are able to be used, the license item is used for representing the number of ports able to be used; and the steps A, B and C include the following steps A', B' and C' respectively:

A'. if P≤M, controlling all the P ports to be able to be used necessarily no matter what an online sequence is;

B'. if N≥P, controlling the P ports to be preferentially usable; and then, selecting N−P ports that come online first, to serve as the ports able to be used, from the remaining M−P ports according to the online sequence, in which when N−P≥M−P, all the M−P ports are able to be used, and when N−P<M−P, the N−P ports that come online first are selected to serve as the ports able to be used;

C'. if N<P, controlling the N ports, that come online first and are preferentially selected from the P ports according to the online sequence, to be able to be used, and controlling the remaining M−N ports no to be able to be used.

In an exemplary embodiment, when the function is that ports are able to be used, the license item is used for representing the number of ports able to be used; and the step D includes: if N≥M, controlling all the M ports to be able to be used, and when N<M, selecting the N ports that come online first to be able to be used according to an online sequence of ports.

A fine-grained resource control apparatus includes: at least one processor configured to execute a configuration module, a judgment module and a control module, in which the configuration module is arranged to: define, for a function of which resource usage is needed to be restricted, a license item in a license file, in which the license item is used for representing a resource restriction number for supporting the function; the judgment module is arranged to: judge whether a preferential support command is preset for resources of the function; and the control module is arranged to: control the resources of the function according to the preferential support command, a value of the license item and an actual resource number for supporting the function if the judgment module determines that the preferential support command is preset for the resources of the function, or control the resources of the function directly according to the value of the license item and the actual resource number for supporting the function if the judgment module determines that the preferential support command is not preset for the resources of the function.

In an exemplary embodiment, the preferential support command specifies P resources for preferentially supporting the function; when assuming the value of the license item is N and the actual resource number for supporting the function is M, the control module is arranged to control the resources of the function according to the preferential support command, the value of the license item and the actual resource number for supporting the function in the following manners:

A. if P≤M, a controller controls all the P resources to necessarily support the function no matter what an online sequence is;

B. if N≥P, the controller controls the P resources to preferentially support the function, and the number of the occupied resources is not released even if the resources are not initiated or are damaged; and then, the controller selects N−P resources that come online first, to serve as the resources for supporting the function, from the remaining M−P resources according to the online sequence, in which, when N−P≥M−P, all the M−P resources support the function, and when N−P<M−P, the N−P resources that come online first are selected to serve as the resources for supporting the function;

C. if N<P, the controller controls the N resources, that come online first and are preferentially selected from the P resources according to the online sequence, to support the function, and controls the remaining M−N resources not to support the function.

In an exemplary embodiment, the control module is arranged to control the resources of the function directly according to the value of the license item and the actual resource number for supporting the function in the following manner: assuming the value of the license item is N and the actual resource number for supporting the function is M; D. if N≥M, controlling the M resources to support the function, and if N<M, selecting the N resources that come online first to serve as the resources for supporting the function according to an online sequence of resources.

In an exemplary embodiment, when the function is a value-added service function, the license item is used for representing the number of single boards for supporting the value-added service function; the preferential support command specifies that the number of single boards for preferentially supporting the value-added service function is P; and the control module is arranged to execute the steps A, B and C respectively in the following manners:

if P≤M, controlling all the P single boards to necessarily support the value-added service function no matter what an online sequence is;

if N≥P, controlling the P single boards to preferentially support the value-added service function; and then, selecting N−P single boards that come online first, to serve as the single boards for supporting the value-added service function, from the remaining M−P single boards according to the online sequence, in which, when N−P≥M−P, all the M−P single boards support the value-added service function, and when N−P<M−P, the N−P single boards that come online first are selected to serve as the resources for supporting the value-added service function;

if N<P, controlling the N single boards, that come online first and are preferentially selected from the P single boards according to the online sequence, to support the value-added service function, and controlling the remaining M−N single boards not to support the value-added service function.

In an exemplary embodiment, when the function is a value-added service function, the license item is used for representing the number of single boards for supporting the value-added service function; the preferential support command specifies that the number of single boards for preferentially supporting the value-added service function is P; and the control module is arranged to execute the step D in the following manners: if N≥M, controlling all the M single boards to support the value-added service function, and if N<M, selecting the N single boards that come online first to serve as the single boards for supporting the value-added service function according to the online sequence of resources.

In an exemplary embodiment, when the function is that ports are able to be used, the license item is used for representing the number of ports able to be used; and the control module is arranged to execute the step A, B and C respectively in the following manners:

if P≤M, controlling all the P ports to be able to be used necessarily no matter what an online sequence is;

if N≥P, controlling the P ports to be preferentially usable; and then, selecting N−P ports that come online first, to serve as the ports able to be used, from the remaining M−P ports according to the online sequence, in which when N−P≥M−P, all the M−P ports are able to be used, and when N−P<M−P, the N−P ports that come online first are selected to serve as the ports able to be used;

if N<P, controlling the N ports, that come online first and are preferentially selected from the P ports according to the online sequence, to be able to be used, and controlling the remaining M−N ports no to be able to be used.

In an exemplary embodiment, when the function is that ports are able to be used, the license item is used for representing the number of ports able to be used; and the control module is arranged to execute the step D in the following manner: if N≥M, controlling all the M ports to be able to be used, and when N<M, selecting the N ports that come online first to be able to be used according to an online sequence of ports.

After the abovementioned technical solutions are adopted, the defects in the related art are overcome. The resource management granularity is finer by setting the license item, so that the user can only use resources within a predetermined range, thereby ensuring the maximization of the resource value.

DETAILED DESCRIPTION

The following is a brief introduction for a subject described herein in detail. The brief introduction is not intended to restrict the scope of protection of claims.

The technical solution of the present disclosure will be described in more detail hereinafter in conjunction with the drawings and embodiments.

It is apparent to those skilled in the art that the embodiments of the present disclosure and all features in the embodiments may be combined with each other if there is no conflict, and fall within the scope of protection of the present disclosure. In addition, although a logical order is shown in the flowchart, the shown or described steps may be executed in an order different from the order here under certain conditions.

Figure 1:
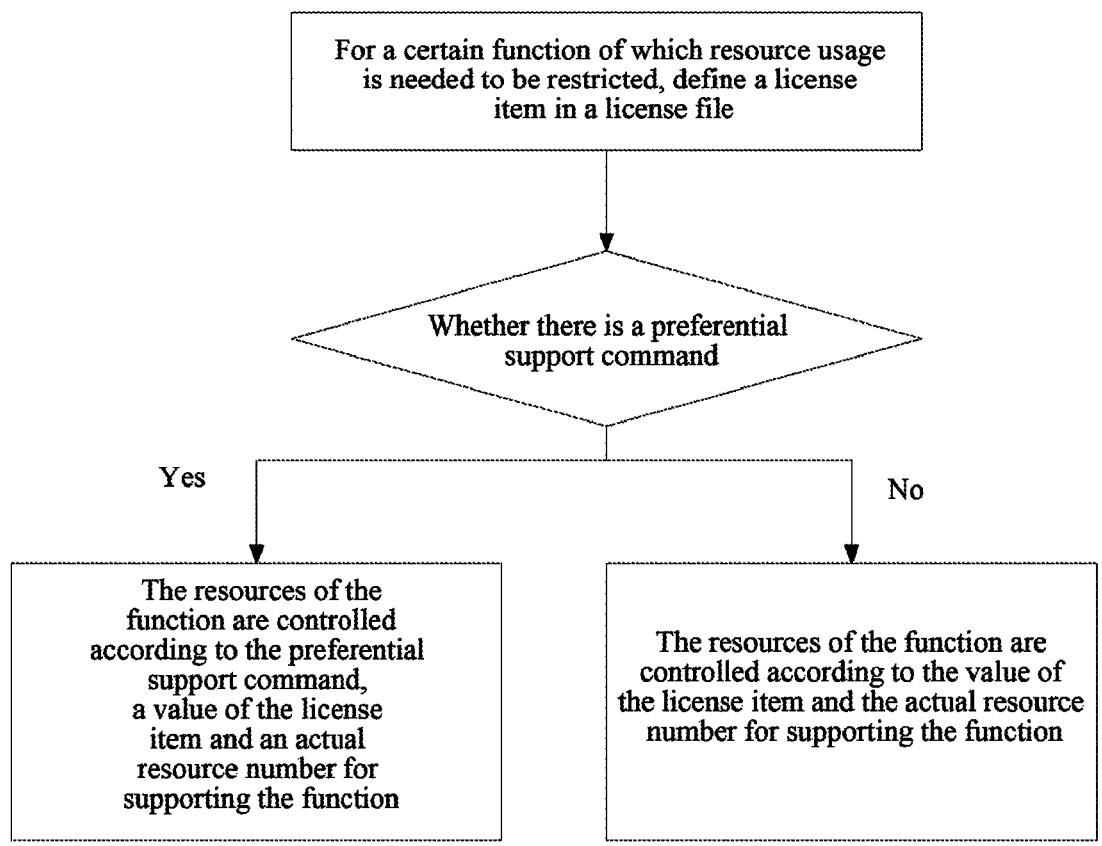
FIG. 1 is a flowchart of a fine-grained resource control method according to an embodiment of the present disclosure.

An embodiment of the present disclosure provides a fine-grained resource control method. As shown in FIG. 1, the method includes the steps as follows.

For a certain function of which resource usage is needed to be restricted, a license item is defined in a license file, and the license item is used for representing a resource restriction number for supporting the function.

It is judged whether a preferential support command is preset for resources of the function, if presetting, the resources of the function are controlled according to the preferential support command, a value of the license item and an actual resource number for supporting the function, otherwise, the resources of the function are controlled directly according to the value of the license item and the actual resource number for supporting the function.

Generally, the purpose of control is to make the resource number for supporting the function not exceed the value of the license item.

In an exemplary embodiment, the step of control is executed by a controller, and the controller is a network communication product such as a router or a switcher, etc.

In an exemplary embodiment, the license file is stored in the controller or stored in a controlled equipment.

In an exemplary embodiment, the preferential support command specifies P resources for preferentially supporting the function. The method further includes assuming the value of the license item is N and the actual resource number for supporting the function is M.

The step of controlling the resources of the function according to the preferential support command, the value of the license item and the actual resource number for supporting the function includes the following steps A, B and C.

A. if P≤M, all the P resources are controlled to necessarily support the function no matter what an online sequence is.

B. if N≥P, the P resources are controlled to preferentially support the function, and the number of the occupied resources is not released even if the resources are not initiated or are damaged; and then, N−P resources that come online first, to serve as the resources for supporting the function, are selected from the remaining M−P resources according to the online sequence, in which, when N−P≥M−P, all the M−P resources support the function, and when N−P<M−P, the N−P resources that come online first are selected to serve as the resources for supporting the function.

C. if N<P, the N resources, that come online first and are preferentially selected from the P resources according to the online sequence, are controlled to support the function, and the remaining M−N resources are controlled to not support the function.

In an exemplary embodiment, the step of controlling the resources of the function according to the value of the license item and the actual resource number for supporting the function includes the following steps. The value of the license item is assumed as N and the actual resource number for supporting the function is assumed as M. D. if N≥M, the M resources are controlled to support the function, and if N<M, the N resources that come online first are selected to serve as the resources for supporting the function according to an online sequence of resources.

In an exemplary embodiment, when the function is a value-added service function, the license item is used for representing the number of single boards for supporting the value-added service function, and the preferential support command specifies that the number of single boards for preferentially supporting the value-added service function is P.

The steps A, B, C and D respectively include the following steps.

If P≤M, all the P single boards are controlled to necessarily support the value-added service function no matter what an online sequence is.

If N≥P, the P single boards are controlled to preferentially support the value-added service function; and then, N−P single boards that come online first, to serve as the single boards for supporting the value-added service function, are selected from the remaining M−P single boards according to the online sequence, in which, when N−P≥M−P, all the M−P single boards support the value-added service function, and when N−P<M−P, the N−P single boards that come online first are selected to serve as the resources for supporting the value-added service function.

If N<P, the N single boards, that come online first and are preferentially selected from the P single boards according to the online sequence, are controlled to support the value-added service function, and the remaining M−N single boards are controlled to not support the value-added service function.

If N≥M, all the M single boards are controlled to support the value-added service function, and if N<M, the N single boards that come online first are selected to serve as the single boards for supporting the value-added service function according to the online sequence of resources.

In an exemplary embodiment, when the function is that ports are able to be used, the license item is used for representing the number of ports able to be used; and the steps A, B, C and D respectively include the following steps.

If P≤M, all the P ports are controlled to be able to be used necessarily no matter what an online sequence is.

If N≥P, the P ports are controlled to be preferentially usable; and then, N−P ports that come online first, to serve as the ports able to be used, are selected from the remaining M−P ports according to the online sequence, in which when N−P≥M−P, all the M−P ports are able to be used, and when N−P<M−P, the N−P ports that come online first are selected to serve as the ports able to be used.

If N<P, the N ports, that come online first and are preferentially selected from the P ports according to the online sequence, are controlled to be able to be used, and the remaining M−N ports are controlled to be not able to be used.

If N≥M, all the M ports are controlled to be able to be used, and when N<M, the N ports that come online first are selected to be able to be used according to an online sequence of ports.

Figure 2:
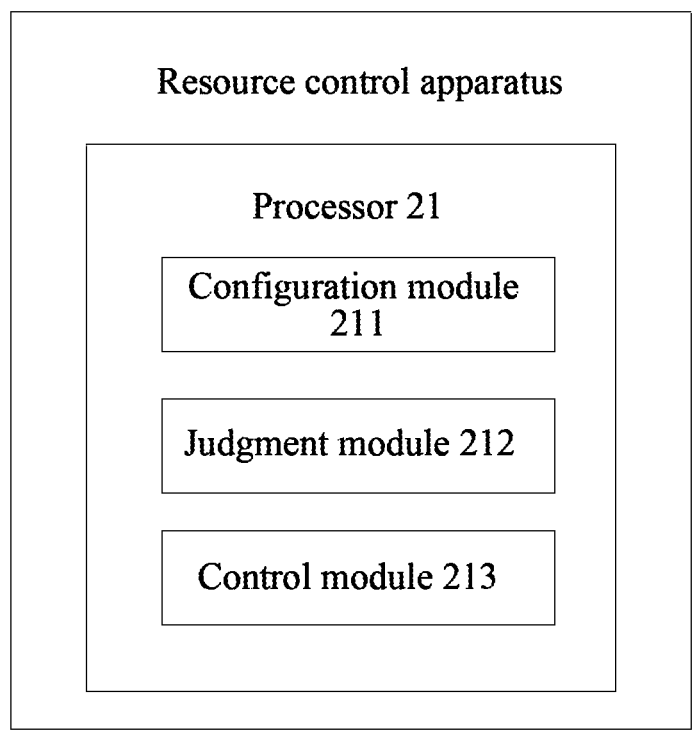
FIG. 2 is a schematic diagram of a fine-grained resource control apparatus according to an embodiment of the present disclosure.

An embodiment of the present disclosure also provides a fine-grained resource control apparatus. As shown in FIG. 2, the apparatus includes: at least one processor 21 which executes a configuration module 211, a judgment module 212 and a control module 213.

The configuration module 211 is arranged to: define, for a function of which resource usage is needed to be restricted, a license item in a license file, in which the license item is used for representing a resource restriction number for supporting the function.

The judgment module 212 is arranged to: judge whether a preferential support command is preset for resources of the function.

The control module 213 is arranged to: control the resources of the function according to the preferential support command, a value of the license item and an actual resource number for supporting the function if the judgment module 212 determines that the preferential support command is preset for the resources of the function, or control the resources of the function directly according to the value of the license item and the actual resource number for supporting the function if the judgment module 212 determines that the preferential support command is not preset for the resources of the function.

In an exemplary embodiment, the control module is a network communication product such as a router or a switch, etc.

In an exemplary embodiment, the license file is stored in the controller or stored in a controlled equipment.

In an exemplary embodiment, the preferential support command specifies P resources for preferentially supporting the function.

When assuming the value of the license item is N and the actual resource number for supporting the function is M, the control module 213 is arranged to control the resources of the function according to the preferential support command, the value of the license item and the actual resource number for supporting the function in the following manners:

A. if P≤M, a controller controls all the P resources to necessarily support the function no matter what an online sequence is.

B. if N≥P, the controller controls the P resources to preferentially support the function, and the number of the occupied resources is not released even if the resources are not initiated or are damaged; and then, the controller selects N−P resources that come online first, to serve as the resources for supporting the function, from the remaining M−P resources according to the online sequence, in which, when N−P≥M−P, all the M−P resources support the function, and when N−P<M−P, the N−P resources that come online first are selected to serve as the resources for supporting the function.

C. if N<P, the controller controls the N resources, that come online first and are preferentially selected from the P resources according to the online sequence, to support the function, and controls the remaining M−N resources not to support the function.

In an exemplary embodiment, the control module 213 is arranged to control the resources of the function according to the value of the license item and the actual resource number for supporting the function in the following manner. It is assumed that the value of the license item is N and the actual resource number for supporting the function is M. D. if N≥M, the M resources are controlled to support the function, and if N<M, the N resources that come online first are selected to serve as the resources for supporting the function according to an online sequence of resources.

In an exemplary embodiment, when the function is a value-added service function, the license item is used for representing the number of single boards for supporting the value-added service function, and the preferential support command specifies that the number of single boards for preferentially supporting the value-added service function is P.

The control module 213 is arranged to execute the steps A, B and C respectively in the following manners.

If P≤M, the controller controls all the P single boards to necessarily support the value-added service function no matter what an online sequence is.

If N≥P, the controller controls the P single boards to preferentially support the value-added service function; and then, selects N−P single boards that come online first, to serve as the single boards for supporting the value-added service function, from the remaining M−P single boards according to the online sequence, in which, when N−P≥M−P, all the M−P single boards support the value-added service function, and when N−P<M−P, the N−P single boards that come online first are selected to serve as the resources for supporting the value-added service function.

If N<P, the controller controls the N single boards, that come online first and are preferentially selected from the P single boards according to the online sequence, to support the value-added service function, and controls the remaining M−N single boards not to support the value-added service function.

The control module 213 is arranged to execute the step D in the following manners: if N≥M, controlling all the M single boards to support the value-added service function, and if N<M, selecting the N single boards that come online first to serve as the single boards for supporting the value-added service function according to the online sequence of resources.

In an exemplary embodiment, when the function is that ports are able to be used, the license item is used for representing the number of ports able to be used; and the control module 213 is arranged to execute the step A, B and C respectively in the following manners.

If P≤M, all the P ports are controlled to be able to be used necessarily no matter what an online sequence is.

If N≥P, the P ports are controlled to be preferentially usable; and then, N−P ports that come online first, to serve as the ports able to be used, are selected from the remaining M−P ports according to the online sequence, in which when N−P≥M−P, all the M−P ports are able to be used, and when N−P<M−P, the N−P ports that come online first are selected to serve as the ports able to be used.

If N<P, the N ports, that come online first and are preferentially selected from the P ports according to the online sequence, are controlled to be able to be used, and the remaining M−N ports are controlled to be not able to be used.

The control module 213 is arranged to execute the step D in the following manner: if N≥M, controlling all the M ports to be able to be used, and when N<M, selecting the N ports that come online first to be able to be used according to an online sequence of ports.

In an exemplary embodiment, the preferential support command is set according to a payment condition after a user pays a corresponding charge for the function. If the charge is large, the resource number, set in the preferential support command, for supporting the function is large. Otherwise, the resource number, set in the preferential support command, for supporting the function is small. In this way, it can be ensured that the resource value is maximized under the control of the controller. For a user who does not pay, resources for supporting the function are restricted according to the value of the license item. So, the problem of misapplication of resources which are not paid is solved. Therefore, the abovementioned technical solution overcomes the defects in the related art. A license item is set to make resource management granularity finer, so that the user can only use resources within a predetermined range, thereby ensuring that the resource value is maximized.

Implementation of the technical solution will be further described in detail hereinafter in conjunction with following examples.

EXAMPLE ONE

A hardware single board may package various single boards physically, and then hardware prices are different according to different software supports. For example, a single board H of a router is low in price, and only supports an SR service but does not support value-added services such as a CGN. The price of a single board A, which supports value-added services such as SR+CGN, etc., is higher than the price of the single board H for more than 30%, but the single boards H and A have the same hardware. Due to no control of a software license, the value-added services such as the CGN are also opened on the sold single board H by the user sometimes, which results in that the corresponding charge cannot be gained.

In order to solve the abovementioned problem, a method provided in the Example One includes the steps as follows.

1. The system takes the single board A as supporting value-added service functions such as a CGN, etc., in default and takes the single board H as not supporting the value-added service functions such as the CGN, etc.

2. For supporting the value-added service function such as the CGN, a performance license item CGN_FUNCTION_PFU_NUM is defined, which means: the number of single boards H for supporting the value-added service function such as the CGN.

3. After reading CGN_FUNCTION_PFU_NUM through a license file, the equipment controls a total single board number of the single board H supporting the value-added service function such as the CGN. The step may be executed in the following manners.

It is assumed that CGN_FUNCTION_PFU_NUM=N in the license file and the number of the single boards H on the equipment is M.

A. If a CGN function enable slot does not specify a certain single board H to preferentially support the value-added service function such as the CGN, or if there is no that command at all, when N>=M, M single boards H support the value-added service function such as the CGN, and when N<M, N single boards H that come online first are selected to be single boards supporting the value-added service function such as the CGN according to an online sequence of single boards H.

B. The equipment provides a command, a single board H specified in the command preferentially supports the value-added service function such as the CGN. For example, a command format may be similar to: CGN function enable slot . . . (it should be noted that the command is only valid to the single board capable of being upgraded to support the CGN function, namely the single board H, but is invalid to the single board A).

C1. If the CGN function enable slot specifies P (P≤M) single boards H in advance to preferentially support the value-added service function such as the CGN, the P single boards must be reserved to preferentially support the value-added service function such as the CGN no matter what an online sequence is.

C2. When N≥P, the specified P single boards preferentially support the value-added service function such as the CGN (even if the single board is not activated or is damaged, the occupation number of the single board is not released). Then, N−P single boards that come online first are selected from the remaining M−P single boards according to the online sequence to support the value-added service function such as the CGN. When N−P≥M−P, the M−P single boards all support the value-added service function such as the CGN. When N−P<M−P, the N−P single boards that come online first are selected to support the value-added service function such as the CGN.

C3. When N<P, the N single boards that come online first are preferentially selected from the specified P single boards according to the online sequence to support the value-added service function such as the CGN, and the remaining M−N (M≥P) single boards do not support the value-added service function such as the CGN. In such way, when the single board number, set by the user, for supporting the value-added service function such as the CGN exceeds the single board number, applied by the license file, for supporting the value-added service function such as the CGN, only the single board number, applied by the license file, for supporting the value-added service function such as the CGN is available at most.

EXAMPLE TWO

Usually, a hardware single board physically includes several port numbers such as 8, 16 and 24. However, when a user purchases, the number of ports required by the user maybe not an integral multiple of the number of ports of one single board, and then an equipment supplier may only configure the number of ports larger than the number of ports required by the user. Due to no control of the software license, sold redundant ports are also used by the user sometimes, which results in that the corresponding charge cannot be gained.

In order to solve the abovementioned problem, a method provided by Example Two includes the steps as follows.

1. For specific resources, a license item PORT_FUNCTION_NUM is defined, which means the number of ports which can be used.

2. The equipment reads a value of PORT_FUNCTION_NUM in the license item, and controls the number of supported ports not to exceed PORT_FUNCTION_NUM. The step may be executed in the following manners.

It is assumed that PORT_FUNCTION_NUM=N in the license file and the number of ports supported on the equipment is M.

A. If the command does not specify to preferentially use a certain port on the equipment or if there is no that command at all, when N≥M, the M ports may all be used, and when N<M, the N ports that come online first are selected according to a port online sequence to be used.

B. The equipment provides a command, and the command specifies whether the equipment preferentially uses the port.

C1. If the command specifies P(P≤M) ports on the equipment to be used in advance, the P ports may be reserved to be preferentially used no matter what an online sequence is.

C2. When N≥P, the specified P ports are preferentially used (even if the port is not activated or is damaged, the occupation number of the ports is not released). Then, the N−P ports that come online first are selected from the remaining M−P ports according to the online sequence to be used. When N−P≥M−P, all the M−P ports are used, and when N−P<M−P, the N−P ports that come online first are selected to be used.

C3. When N<P, N ports that come online first are preferentially selected from the specified P ports according to the online sequence to be used, and the remaining M−N ports cannot be used.

An embodiment of the present disclosure also provides a computer program including program instructions. When the program instructions are executed by a terminal, the terminal is enabled to execute any fine-grained resource control method mentioned above.

An embodiment of the present disclosure also provides a carrier carrying the computer program.

After the drawings and the detailed description are read and understood, other aspects may be understood.

Those of ordinary skill in the art may understand that all or some steps in the aforementioned method may be completed by instructing relevant hardware via a program, and the program may be stored in a computer-readable storage medium such as a read-only memory, a magnetic disk or an optical disc. In the exemplary embodiments, all or some steps in the aforementioned embodiments may be implemented by using one or more integrated circuits. Correspondingly, each module/unit in the aforementioned embodiments may be implemented in a hardware form or may be implemented in a software function module form. The present disclosure is not limited to combination of any specific hardware and software.

The present disclosure may also have various other embodiments. Those skilled in the art may make various corresponding variations and transformations according to the present disclosure without departing from the spirit and essence of the present disclosure, but these corresponding variations and transformations shall fall within the scope of protection of the claims of the present disclosure.

INDUSTRIAL APPLICABILITY

After the abovementioned technical solution is adopted, the defects in the related art are overcome. The license item is set to make the resource management granularity finer, so that a user can only use the resources within a predetermined range, thereby ensuring that the resource value is maximized. Therefore, the present disclosure has strong industrial applicability.

What is claimed is:

1. A fine-grained resource control method, comprising the following steps:
defining, for a function of which resource usage is needed to be restricted, a license item in a license file, wherein the license item is used for representing a resource restriction number for supporting the function; and
judging whether a preferential support command is preset for resources of the function, if presetting, controlling the resources of the function according to the preferential support command, a value of the license item and an actual resource number for supporting the function, otherwise, controlling the resources of the function directly according to the value of the license item and the actual resource number for supporting the function,
wherein the preferential support command specifies P resources for preferentially supporting the function, assuming the value of the license item is N and the actual resource number for supporting the function is M,
the step of controlling the resources of the function according to the preferential support command, the value of the license item and the actual resource number for supporting the function comprises:
B. if N≥P, controlling the P resources to preferentially support the function, and the number of the occupied resources is not released even if the resources are not initiated or are damaged; and then, selecting N−P resources that come online first, to serve as the resources for supporting the function, from the remaining M−P resources according to the online sequence, wherein, when N−P≥M−P, all the M−P resources support the function, and when N−P<M−P, the N−P resources that come online first are selected to serve as the resources for supporting the function.

2. The fine-grained resource control method according to claim 1, wherein the step of controlling the resources of the function according to the preferential support command, the value of the license item and the actual resource number for supporting the function or controlling the resources of the function directly according to the value of the license item and the actual resource number for supporting the function is executed by a controller, wherein the controller is a router or another external controller equipment other than the router.

3. The fine-grained resource control method according to claim 2, wherein the license file is stored in the controller or stored in a controlled equipment.

4. The fine-grained resource control method according to claim 1, wherein
the step of controlling the resources of the function according to the preferential support command, the value of the license item and the actual resource number for supporting the function further comprises:
A. if P≤M, controlling all the P resources to necessarily support the function no matter what an online sequence is;
C. if N<P, controlling the N resources, that come online first and are preferentially selected from the P resources according to the online sequence, to support the function, and controlling the remaining M−N resources not to support the function.

5. The fine-grained resource control method according to claim 1, wherein
the step of controlling the resources of the function directly according to the value of the license item and the actual resource number for supporting the function comprises:
D. if N≥M, controlling the M resources to support the function, and if N<M, selecting the N resources that come online first to serve as the resources for supporting the function according to an online sequence of resources.

6. The fine-grained resource control method according to claim 4, wherein
when the function is a value-added service function, the license item is used for representing the number of single boards for supporting the value-added service function;
the preferential support command specifies that the number of single boards for preferentially supporting the value-added service function is P; and
the steps A, B and C comprise the following steps A', B' and C' respectively:
A'. if P≤M, controlling all the P single boards to necessarily support the value-added service function no matter what an online sequence is;
B'. if N≥P, controlling the P single boards to preferentially support the value-added service function; and then, selecting N−P single boards that come online first, to serve as the single boards for supporting the value-added service function, from the remaining M−P single boards according to the online sequence, wherein, when N−P≥M−P, all the M−P single boards support the value-added service function, and when N−P<M−P, the N−P single boards that come online first are selected to serve as the resources for supporting the value-added service function;
C'. if N<P, controlling the N single boards, that come online first and are preferentially selected from the P single boards according to the online sequence, to support the value-added service function, and controlling the remaining M−N single boards not to support the value-added service function.

7. The fine-grained resource control method according to claim 5, wherein
when the function is a value-added service function, the license item is used for representing the number of single boards for supporting the value-added service function;
the preferential support command specifies that the number of single boards for preferentially supporting the value-added service function is P; and
the step D comprises:
if N≥M, controlling all the M single boards to support the value-added service function, and if N<M, selecting the N single boards that come online first to serve as the single boards for supporting the value-added service function according to the online sequence of resources.

8. The fine-grained resource control method according to claim 4, wherein
when the function is that ports are able to be used, the license item is used for representing the number of ports able to be used; and
the steps A, B and C comprise the following steps A', B' and C' respectively:
A'. if P≤M, controlling all the P ports to be able to be used necessarily no matter what an online sequence is;
B'. if N≥P, controlling the P ports to be preferentially usable; and then, selecting N−P ports that come online first, to serve as the ports able to be used, from the remaining M−P ports according to the online sequence, wherein when N−P≥M−P, all the M−P ports are able to be used, and when N−P<M−P, the N−P ports that come online first are selected to serve as the ports able to be used;
C'. if N<P, controlling the N ports, that come online first and are preferentially selected from the P ports according to the online sequence, to be able to be used, and controlling the remaining M−N ports to be not able to be used.

9. The fine-grained resource control method according to claim 5, wherein
when the function is that ports are able to be used, the license item is used for representing the number of ports able to be used; and
the step D comprises: if N≥M, controlling all the M ports to be able to be used, and when N<M, selecting the N ports that come online first to be able to be used according to an online sequence of ports.

10. A fine-grained resource control apparatus, comprising a processor and a memory, wherein the memory stores processor-executable programs, and the programs comprise: a configuration module, a judgment module and a control module,
wherein
the configuration module is arranged to: define, for a function of which resource usage is needed to be restricted, a license item in a license file, wherein the license item is used for representing a resource restriction number for supporting the function;

the judgment module is arranged to: judge whether a preferential support command is preset for resources of the function; and the control module is arranged to: control the resources of the function according to the preferential support command, a value of the license item and an actual resource number for supporting the function if the judgment module determines that the preferential support command is preset for the resources of the function, or control the resources of the function directly according to the value of the license item and the actual resource number for supporting the function if the judgment module determines that the preferential support command is not preset for the resources of the function, wherein the preferential support command specifies P resources for preferentially supporting the function, assuming the value of the license item is N and the actual resource number for supporting the function is M, the control module is arranged to control the resources of the function according to the preferential support command, the value of the license item and the actual resource number for supporting the function in the following manners:

B. if N≥P, the control module controls the P resources to preferentially support the function, and the number of the occupied resources is not released even if the resources are not initiated or are damaged; and then, the control module selects N−P resources that come online first, to serve as the resources for supporting the function, from the remaining M−P resources according to the online sequence, wherein, when N−P≥M−P, all the M−P resources support the function, and when N−P<M−P, the N−P resources that come online first are selected to serve as the resources for supporting the function.

11. The fine-grained resource control apparatus according to claim 10, wherein the control module is further arranged to control the resources of the function according to the preferential support command, the value of the license item and the actual resource number for supporting the function in the following manners:

A. if P≤M, the control module controls all the P resources to necessarily support the function no matter what an online sequence is;

C. if N<P, the control module controls the N resources, that come online first and are preferentially selected from the P resources according to the online sequence, to support the function, and controls the remaining M−N resources not to support the function.

12. The fine-grained resource control apparatus according to claim 10, wherein the control module is arranged to control the resources of the function directly according to the value of the license item and the actual resource number for supporting the function in the following manner:

D. if N≥M, controlling the M resources to support the function, and if N<M, selecting the N resources that come online first to serve as the resources for supporting the function according to an online sequence of resources.

13. The fine-grained resource control apparatus according to claim 11, wherein when the function is a value-added service function, the license item is used for representing the number of single boards for supporting the value-added service function;

the preferential support command specifies that the number of single boards for preferentially supporting the value-added service function is P; and the control module is arranged to execute the steps A, B and C respectively in the following manners:

if P≤M, controlling all the P single boards to necessarily support the value-added service function no matter what an online sequence is;

if N≥P, controlling the P single boards to preferentially support the value-added service function; and then, selecting N−P single boards that come online first, to serve as the single boards for supporting the value-added service function, from the remaining M−P single boards according to the online sequence, wherein, when N−P≥M−P, all the M−P single boards support the value-added service function, and when N−P<M−P, the N−P single boards that come online first are selected to serve as the resources for supporting the value-added service function;

if N<P, controlling the N single boards, that come online first and are preferentially selected from the P single boards according to the online sequence, to support the value-added service function, and controlling the remaining M−N single boards not to support the value-added service function.

14. The fine-grained resource control apparatus according to claim 12, wherein when the function is a value-added service function, the license item is used for representing the number of single boards for supporting the value-added service function;

the preferential support command specifies that the number of single boards for preferentially supporting the value-added service function is P;

the control module is arranged to execute the step D in the following manners: if N≥M, controlling all the M single boards to support the value-added service function, and if N<M, selecting the N single boards that come online first to serve as the single boards for supporting the value-added service function according to the online sequence of resources.

15. The fine-grained resource control apparatus according to claim 11, wherein when the function is that ports are able to be used, the license item is used for representing the number of ports able to be used; and the control module is arranged to execute the step A, B and C respectively in the following manners:

if P≤M, controlling all the P ports to be able to be used necessarily no matter what an online sequence is;

if N≥P, controlling the P ports to be preferentially usable; and then, selecting N−P ports that come online first, to serve as the ports able to be used, from the remaining M−P ports according to the online sequence, wherein when N−P≥M−P, all the M−P ports are able to be used, and when N−P<M−P, the N−P ports that come online first are selected to serve as the ports able to be used;

if N<P, controlling the N ports, that come online first and are preferentially selected from the P ports according to the online sequence, to be able to be used, and controlling the remaining M−N ports to be not able to be used.

16. The fine-grained resource control apparatus according to claim 12, wherein when the function is that ports are able to be used, the license item is used for representing the number of ports able to be used; and the control module is arranged to execute the step D in the following manner: if N≥M, controlling all the M ports to be able to be used, and when N<M, selecting the N ports that come online first to be able to be used according to an online sequence of ports.

17. The fine-grained resource control method according to claim 2, wherein the method further comprises:

the step of controlling the resources of the function according to the preferential support command, the value of the license item and the actual resource number for supporting the function further comprises:

A. if P≤M, controlling all the P resources to necessarily support the function no matter what an online sequence is;

C. if N<P, controlling the N resources, that come online first and are preferentially selected from the P resources according to the online sequence, to support the function, and controlling the remaining M−N resources not to support the function.

18. The fine-grained resource control method according to claim 17, wherein when the function is a value-added service function, the license item is used for representing the number of single boards for supporting the value-added service function;

the preferential support command specifies that the number of single boards for preferentially supporting the value-added service function is P; and the steps A, B and C comprise the following steps A', B' and C' respectively:

A'. if P≤M, controlling all the P single boards to necessarily support the value-added service function no matter what an online sequence is;

B'. if N≥P, controlling the P single boards to preferentially support the value-added service function; and then, selecting N−P single boards that come online first, to serve as the single boards for supporting the value-added service function, from the remaining M−P single boards according to the online sequence, wherein, when N−P≥M−P, all the M−P single boards support the value-added service function, and when N−P<M−P, the N−P single boards that come online first are selected to serve as the resources for supporting the value-added service function;

C'. if N<P, controlling the N single boards, that come online first and are preferentially selected from the P single boards according to the online sequence, to support the value-added service function, and controlling the remaining M−N single boards not to support the value-added service function.

19. The fine-grained resource control method according to claim 3, wherein the method further comprises:

the step of controlling the resources of the function according to the preferential support command, the value of the license item and the actual resource number for supporting the function further comprises:

A. if P≤M, controlling all the P resources to necessarily support the function no matter what an online sequence is;

C. if N<P, controlling the N resources, that come online first and are preferentially selected from the P resources according to the online sequence, to support the function, and controlling the remaining M−N resources not to support the function.

20. A computer-readable storage medium storing computer-executable instructions used for executing the method according to claim 1.

* * * * *